April 27, 1965   R. H. OLSON   3,180,719
MOLD ARM LOCKING AND CLAMPING DEVICE
Filed Sept. 12, 1961   2 Sheets-Sheet 2

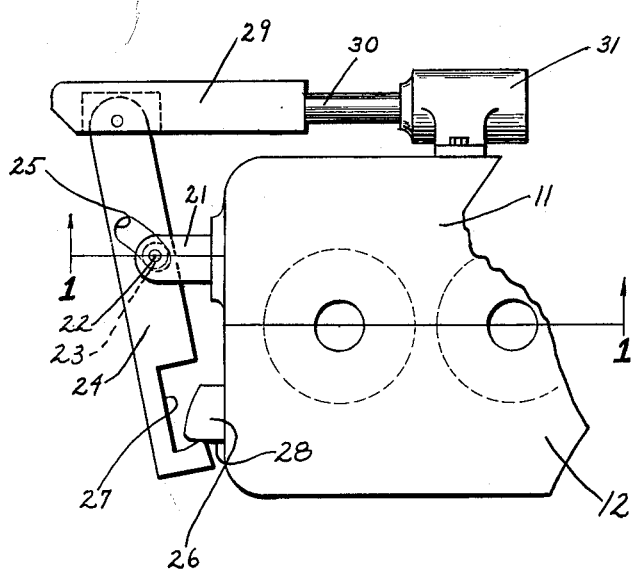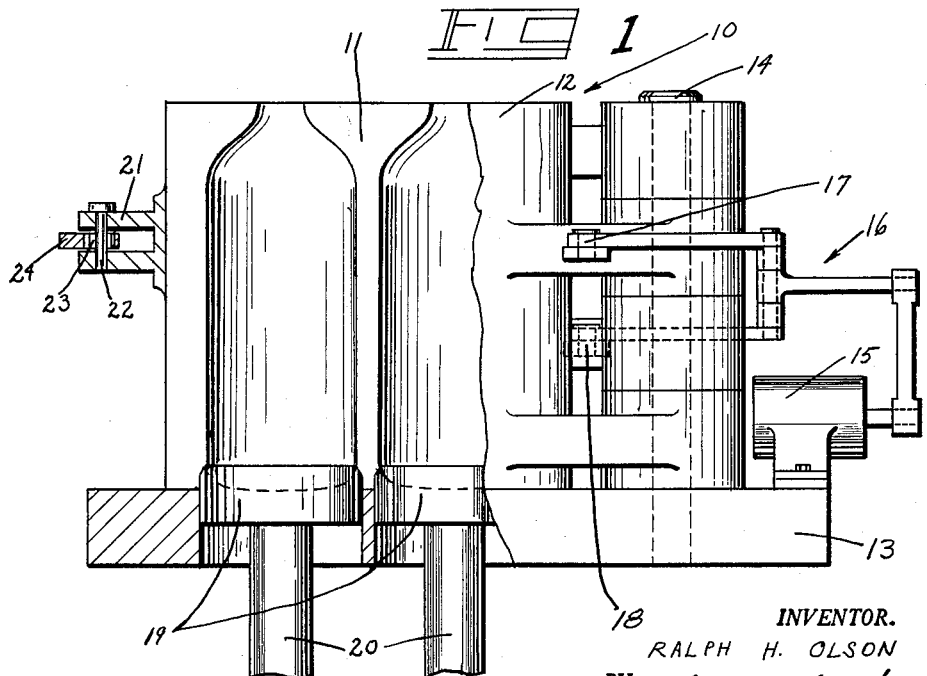

INVENTOR.
RALPH H OLSON
BY W. A. Schuch +
D. T. Irwin
ATTORNEYS

United States Patent Office 3,180,719
Patented Apr. 27, 1965

3,180,719
MOLD ARM LOCKING AND CLAMPING
DEVICE
Ralph H. Olson, Geneva, Switzerland, assignor to Owens-Illinois Glass Company, a corporation of Ohio
Filed Sept. 12, 1961, Ser. No. 137,700
2 Claims. (Cl. 65—357)

This invention relates to apparatus for locking and clamping mold arms together through the application of an initial low pressure which is generated into a toggle arm pressure. In the present instance, the application of this invention is described and illustrated in connection with the clamping and locking of blow mold arms. However, the invention is not limited to such and would be equally applicable for clamping and locking parison mold arms, whether of the inverted type or the upright type.

In the past it has been the practice to clamp split molds together by a mechanism which is supported by a structure other than the mold structure itself. With the prior art type of clamping, stress would be applied to the mold with the resultant disadvantage that the alignment of the molds with the neck rings, plungers or blow heads becomes critical. Any external force applied to the molds which would tend to throw them out of alignment with the other forming parts clearly is not desirable.

Applicant, by providing the clamping mechanism of the invention which is carried by the mold arms themselves, prevents any possibility of the clamping and locking mechanism from causing the molds to become misaligned or to prevent the molds from coming into alignment. With this in mind, it is an object of this invention to provide mold clamping and locking mechanism which is supported entirely by the mold.

It is an additional object of this invention to provide mold clamping and locking mechanism which requires relatively low pressure to effect the clamping.

It is a further object of this invention to provide apparatus for clamping blow molds in closed position wherein the principle of the cam action is utilized to effect the locking of the molds against internal pressures generated during the blowing of the bottles in the molds.

Other objects will be apparent from the following detailed description taken in conjunction with the annexed sheets of drawings wherein:

FIG. 1 is a part sectional elevation of a blow mold and its supporting and actuating mechanism taken at line 1—1 on FIG. 2.

FIG. 2 is a plan view of a portion of FIG. 1 illustrating the mold locking mechanism when in locking position.

Figure 3:
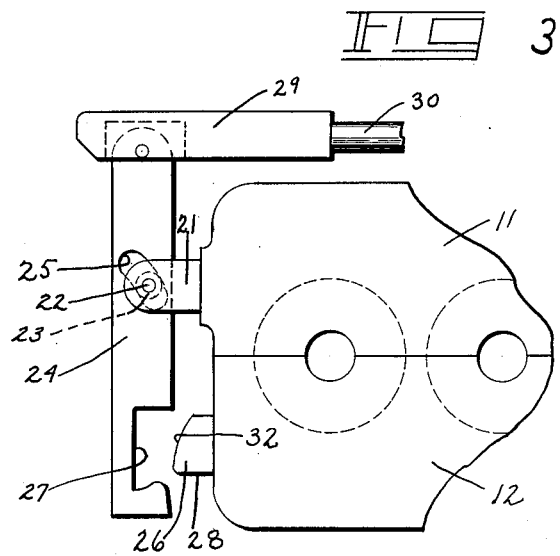
FIG. 3 is a view similar to FIG. 2 with the locking mechanism in an intermediate position.

Referring to the drawings and in particular to FIG. 1, a double cavity blow mold, generally designated 10, having arms 11 and 12 is pivotally mounted on a supporting base 13. The base 13 carries a vertically extending pivot pin 14 which serves as the pivotal axes for the mold arms 11 and 12. The arms 11 and 12 are moved toward and away from each other through the actuation of a hydraulic motor 15 through linkage 16 which is pivotally connected to the mold arms 11 and 12 at 17 and 18. Thus it can readily be seen that the motor 15 through the linkage 16 will alternately open and close the mold arms 11 and 12. A pair of bottom plates 19 are mounted for vertical reciprocation into and out of contact with the bottom of the blow mold 10 by hydraulic motors (not shown) connected to the shafts 20.

Figure 4:
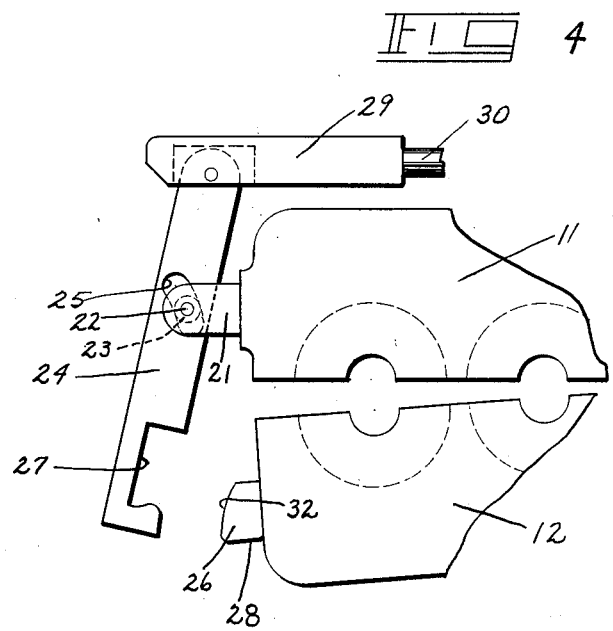
FIG. 4 is a plan view similar to FIGS. 2 and 3 illustrating the locking mechanism in a completely open position.

Referring now to FIGS. 2 to 4, the mold locking and clamping mechanism will be described in detail. The mold arms 11 and 12, as previously described, are adapted to be positioned as shown in FIG. 2 when a bottle is to be formed or blown therein.

The mold arm 11 has a supporting member 21 formed on the end thereof opposite the hinge pin 14. The supporting member 21 takes the form of two horizontally extending arms through which a vertical pin 22 extends. The pin 22 carries a roller 23 thereon intermediate the two arms of the supporting member 21. The roller 23 is adapted to rotate about the axis of the pin 22 and serves as the fulcrum for a horizontally extending clamping lever or arm 24.

The clamping lever or arm 24 has a curved elongated slot 25 formed therethrough in which the roller 23 is adapted to ride. The mold arm 12 has an abutment 26 formed on the end thereof in the same horizontal plane as the support 21. One end of the arm 24 has a hook defining cut-out 27 formed therein which is adapted to engage surface 28 of the abutment 26 when the arm 24 is moved into mold clamping position as shown on FIG. 2. The opposite end of the arm 24 is pivotally connected to a link member 29. A fluid motor 31, fastened to one side of the mold arm 11, has its piston rod 30 connected to or formed integral with the link 29.

The rod 30 is reciprocated by motor 31 in sequence with the operation of the motor 15. For example, as illustrated in FIG. 3, the rod 30 has been moved to the right causing the arm 24 to be pivoted clockwise about the roller 23 and has its clamping end released from the abutment 26. When the lever arm 24 has been pivoted to the extent shown in FIG. 3, the motor 15 may be actuated to begin opening the mold arms 11 and 12. The arm 24 is actually pivoted to the extent shown in FIG. 4 when in complete releasing position. The abutment 26 has a tapered surface 32 provided thereon so that when the mold arms 11 and 12 are being closed, the lever arm 24 will not accidentally prevent closing of the arms by engagement with the abutment 26.

By providing an elongated slot 25 which is curved, as shown in FIGS. 2, 3 and 4, pivoting of the arm 24 in a counter-clockwise direction into engagement with the surface 28 of the abutment 26 will result in a camming action between the roller 23 and the slot 25. In this manner relatively low pressure is used in the motor 31 yet high clamping forces will be transmitted by the arm 24 to the abutment 26.

Thus it can be seen that applicant has provided a convenient arrangement for locking the mold arms together in which a lever arm is pivoted into locking position and by the further application of a relatively small force to the lever arm, a component of force in the closing direction will be transmitted by the arm to the abutment 26. In other words as the link member 29 is moved to the left, from the position shown in FIG. 3, to the position shown in FIG. 2, the distance between the arm pivot axis and its clamping surface will become less resulting in the application of a relatively high closing force to the abutment. This effect takes place because of the camming action between the roller 23 and the slot 25 in the arm 24. In this manner, applicant provides an easily operable arrangement for clamping and locking the mold arms of a glass molding apparatus, which does not apply any stress to the molds from an external source.

While applicant has shown the mold locking and clamping arrangement in conjunction with blow mold mechanism, it should be pointed out that the principles of the invention may be equally applicable to clamping and locking parison mold arms, or any other split, pivotally mounted glass forming molds.

Modifications may be resorted to within the spirit and scope of the appended claims.

I claim:

1. Apparatus for releasably clamping and locking the arms of a hingedly mounted split glass forming mold comprising, a horizontally disposed piston motor mounted on one arm and having an output shaft extending beyond one end of said arm, a roller, means supporting said roller on said one arm at said one end thereof with its axis vertical, a clamping lever arm having a curved, elongated cam slot formed therein intermediate the length thereof, said cam slot extending across a substantial portion of the width of said lever arm and being curved in the direction of the length of said arm, said roller being positioned in said slot and pivotally supporting said lever arm, means pivotally connecting the extending end of said output shaft to one end of said lever arm, a hook defining cutout formed at the other end of said lever arm, and an abutment formed on the end of the other mold supporting arm and extending in the plane of movement of the lever arm, said abutment adapted to be engaged by the lever arm cutout portion when the motor is actuated to pivot the lever arm about the roller axis, said slot being formed to progressively impose extra clamping pressure on said abutment as said shaft is extended by said motor, the clamping of the mold parts and the imposition of extra clamping pressure being effected by a single extension of said shaft by said motor.

2. A low pressure actuated, high clamping force applying locking mechanism for a hingedly mounted pair of opposed split glass forming mold carrying arms comprising, a horizontally disposed fluid motor mounted on the side of one mold arm, said motor having its output shaft extending beyond the forward end of the one mold arm, a roller, a bracket fixed to the forward end of said one mold arm, means for pivotally supporting said roller on said bracket, a generally flat clamping lever, said lever having a slot formed therein intermediate its length, said slot being curved and extending both across a substantial portion of the width of said lever and along the length thereof for a limited extent, the curvature of said slot being from adjacent the outer edge of said lever to adjacent the inner edge thereof with the axis of curvature of the slot being beyond the outer edge of the lever, said lever being mounted with its slot receiving said roller, one end of said lever being pivotally connected to the extending end of said motor output shaft, a hook-defining cut-out formed at the other end of said lever, and an abutment on the end of the other mold carrying arm and extending into the path of movement of said lever, said abutment adapted to be engaged by said cut-out portion of said lever when said motor is actuated to cause pivotal movement of said lever about the roller axis and progressively increasing clamping force is applied to the abutment by the lever due to the longitudinal movement of the lever with respect to the roller upon a single actuation of the motor to effectively shift the fulcrum point on the lever arm toward the clamping end thereof.

References Cited by the Examiner
UNITED STATES PATENTS

| | | | |
|---|---|---|---|
| 297,077 | 4/84 | Herckner | 65—357 |
| 498,347 | 5/93 | Zeigler | 74—518 X |
| 604,907 | 5/98 | Schmunk | 65—360 |
| 646,948 | 4/00 | Brookfield et al. | 65—360 |
| 653,140 | 7/00 | Herckner | 65—357 |
| 985,439 | 2/11 | Muldoon | 65—357 |
| 1,331,471 | 2/20 | Peiler et al. | 65—357 |
| 1,356,032 | 10/20 | Angus | 74—518 |
| 1,584,932 | 5/26 | Handy et al. | 74—518 X |
| 2,611,282 | 9/52 | Bright | 74—518 |

DONALL H. SYLVESTER, *Primary Examiner.*